(12) United States Patent
Mabuchi et al.

(10) Patent No.: US 12,185,000 B2
(45) Date of Patent: Dec. 31, 2024

(54) PIXEL CIRCUIT FOR HIGH DYNAMIC RANGE IMAGE SENSOR

(71) Applicant: OMNIVISION TECHNOLOGIES, INC., Santa Clara, CA (US)

(72) Inventors: Keiji Mabuchi, Cupertino, CA (US); Tiejun Dai, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 176 days.

(21) Appl. No.: 17/810,966

(22) Filed: Jul. 6, 2022

(65) Prior Publication Data
US 2024/0015414 A1    Jan. 11, 2024

(51) Int. Cl.
| | |
|---|---|
| *H04N 25/59* | (2023.01) |
| *H04N 25/46* | (2023.01) |
| *H04N 25/585* | (2023.01) |
| *H04N 25/621* | (2023.01) |
| *H04N 25/771* | (2023.01) |
| *H04N 25/778* | (2023.01) |
| *H04N 25/79* | (2023.01) |

(52) U.S. Cl.
CPC ............ *H04N 25/59* (2023.01); *H04N 25/46* (2023.01); *H04N 25/585* (2023.01); *H04N 25/621* (2023.01); *H04N 25/771* (2023.01); *H04N 25/778* (2023.01); *H04N 25/79* (2023.01)

(58) Field of Classification Search
CPC ...... H04N 25/59; H04N 25/778; H04N 25/46; H04N 25/585; H04N 25/621; H04N 25/771; H04N 25/79
See application file for complete search history.

(56) References Cited

U.S. PATENT DOCUMENTS

| | | |
|---|---|---|
| 9,247,170 B2 | 1/2016 | Komori et al. |
| 10,044,960 B2 | 8/2018 | Mao et al. |
| 10,070,079 B2 | 9/2018 | Hynecek et al. |
| (Continued) | | |

FOREIGN PATENT DOCUMENTS

| | | |
|---|---|---|
| EP | 2832090 B1 | 10/2018 |
| EP | 3609176 A1 | 2/2020 |

OTHER PUBLICATIONS

Sakai et al., "A Pixel-Shared CMOS Image Sensor Using Lateral Overflow Gate," Proceedings of ESSCIRC, 2019 pp. 240-243.
(Continued)

*Primary Examiner* — James M Hannett
(74) *Attorney, Agent, or Firm* — PERKINS COIE LLP (57) ABSTRACT

A pixel circuit includes a first photodiode and a second photodiode. The first and second photodiodes photogenerate charge in response to incident light. A first transfer transistor is coupled to the first photodiode. A first floating diffusion is coupled to the first transfer transistor. A second transfer transistor is coupled to the second photodiode. A second floating diffusion is coupled to the second transfer transistor. A dual floating diffusion transistor is coupled between the first and second floating diffusions. An overflow transistor is coupled to the second photodiode. A capacitor is coupled between a voltage source and the overflow transistor. A capacitor readout transistor is coupled between the capacitor and the second floating diffusion. An anti-blooming transistor coupled between the first photodiode and a power line.

32 Claims, 6 Drawing Sheets

(56) References Cited

U.S. PATENT DOCUMENTS

| | | |
|---|---|---|
| 10,110,840 B2 | 10/2018 | Vilechko |
| 10,250,828 B1 | 4/2019 | Xu et al. |
| 10,284,798 B2 | 5/2019 | Herault et al. |
| 10,536,652 B2 | 1/2020 | Oh |
| 10,630,928 B2 | 4/2020 | Velichko |
| 10,791,292 B1 * | 9/2020 | Geurts ................ H04N 25/771 |
| 10,904,467 B2 | 1/2021 | Geurts |
| 11,201,188 B2 | 12/2021 | Palaniappan et al. |
| 11,218,653 B2 | 1/2022 | Yang et al. |
| 2017/0324917 A1 | 11/2017 | Mlinar et al. |
| 2020/0286945 A1 * | 9/2020 | Palaniappan ........ H04N 23/745 |
| 2021/0099659 A1 | 4/2021 | Miyauchi et al. |
| 2021/0152771 A1 | 5/2021 | Parks |
| 2021/0183926 A1 | 6/2021 | Choi et al. |
| 2021/0243350 A1 | 8/2021 | Johnson |
| 2022/0053152 A1 | 2/2022 | Ikuma et al. |
| 2022/0272289 A1 * | 8/2022 | Oh ......................... H04N 25/59 |

OTHER PUBLICATIONS

Sakano et al., "A_132dB_Single-Exposure-Dynamic-Range CMOS Image Sensor with High Temperature Tolerance," IEEE International Solid-State Circuits Conference, 2020, pp. 106-108.

* cited by examiner

| | CHARGE STORED AT | CHARGE READOUT AT | CG |
|---|---|---|---|
| (1) | LPD | FD1 | HIGH CG (HCG) |
| (2) | LPD | FD1+2 | MIDDLE CG (MCG) |
| (3) | SPD | FD1+2 | MCG |
| (4) | SPD+CAP | FD1+2+3+SPD | LOW CG (LCG) |

PIXEL CIRCUIT FOR HIGH DYNAMIC RANGE IMAGE SENSOR

BACKGROUND INFORMATION

Field of the Disclosure

This disclosure relates generally to image sensors, and in particular but not exclusively, relates to high dynamic range (HDR) complementary metal oxide semiconductor (CMOS) image sensors.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and photogenerate image charge upon absorption of the image light. The image charge photogenerated by the pixels may be measured as analog output image signals on column bitlines that vary as a function of the incident image light. In other words, the amount of image charge photogenerated is proportional to the intensity of the image light, which are read out as analog signals from the column bitlines and converted to digital values to produce digital images (i.e., image data) that represent the external scene.

Standard image sensors have a limited dynamic range of approximately 60 to 70 dB. However, the luminance dynamic range of the real world is much larger. For instance, natural scenes often span a range of 90 dB and greater. In order to capture details in bright highlights and dim shadows simultaneously, high dynamic range (HDR) technologies have been used in image sensors to increase the captured dynamic range.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system with a pixel array including high dynamic range pixel circuits are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with example high dynamic range pixel circuits capable of providing multiple readout signals with different gain settings. In various examples, a pixel circuit includes multiple photodiodes that may have different respective light sensitivities. For instance, in one example a pixel circuit includes a first photodiode and a second photodiode. In the example, the first photodiode has a larger sensing area and therefore has a higher sensitivity to light, while the second photodiode has smaller sensing area and therefore has a lower sensitivity to light compared to the first photodiode.

In the various examples, the charge photogenerated by the first photodiode in response to incident light may be transferred to a first floating diffusion through a first transfer transistor, while the charge photogenerated by the second photodiode in response to incident light may be transferred to a second floating diffusion through a second transfer transistor. In response to bright lighting conditions during an integration period, excess charge photogenerated in the first photodiode may be configured to overflow to the second floating diffusion through a dual floating diffusion transistor, while excess charge photogenerated in the second photodiode may be configured to overflow through an overflow transistor to a third floating diffusion and a capacitor coupled to the third floating diffusion. In the various examples, the dual floating diffusion transistor is coupled between the first and second floating diffusions, and a capacitor readout transistor is coupled between the second and third floating diffusions.

In operation, charge in the first floating diffusion from the first photodiode may be readout from the pixel circuit with a readout signal having a first conversion gain, or a high conversion gain (HCG). Charge that is in the first floating diffusion and in the second floating diffusion from the first photodiode may be readout from the pixel circuit with a readout signal having a second conversion gain, or a middle conversion gain (MCG). Charge that is in the first floating diffusion and in the second floating diffusion from the second photodiode may be readout from the pixel circuit with a readout signal having a third conversion gain, or another middle conversion gain (MCG). Charge that is in the first floating diffusion, in the second floating diffusion, in the third floating diffusion, and in the capacitor from the second photodiode may be readout from the pixel circuit with a readout signal having a fourth conversion gain, or a low conversion gain (LCG). In various examples, it is also appreciated that during a readout period of the second photodiode, an anti-blooming transistor coupled to the first photodiode may be configured to be turned on to disable the first photodiode or to drain the first photodiode of any charges, which therefore prevents the charges from the first photodiode from affecting the readout of the second photodiode.

Figure 1:
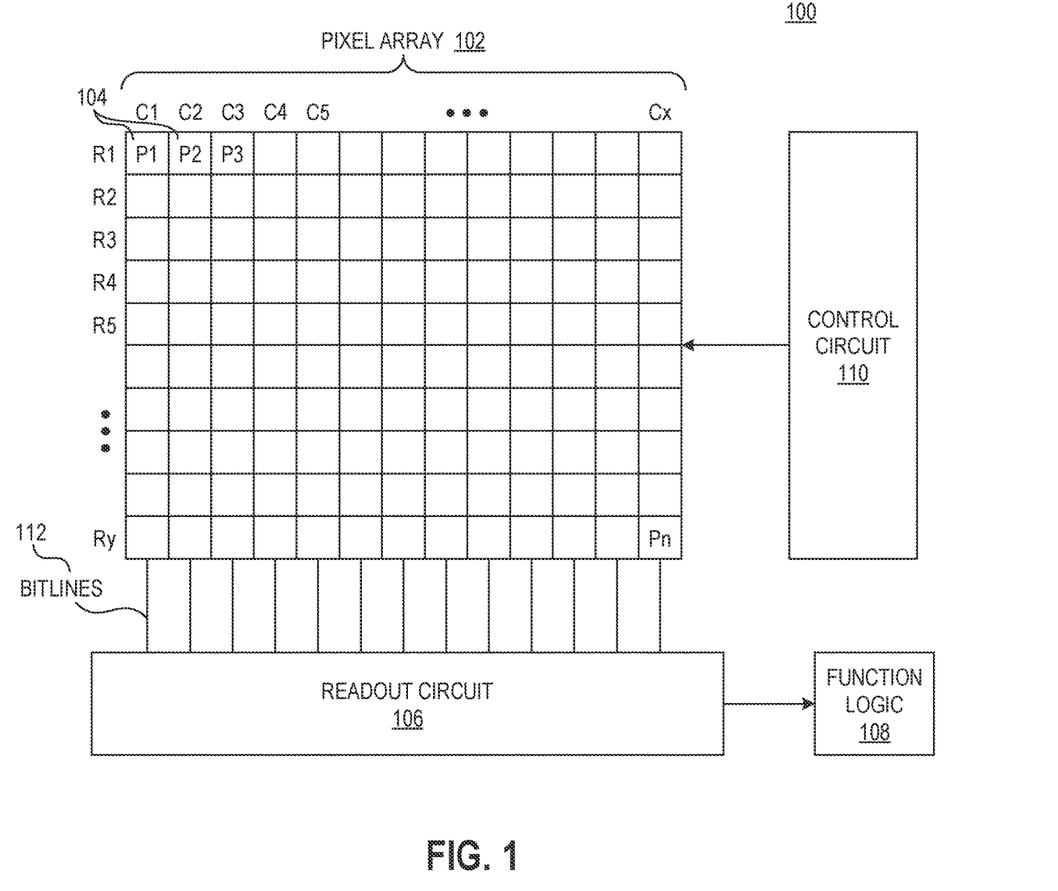
FIG. 1 illustrates one example of an imaging system including a pixel array of high dynamic range pixel circuits in accordance with the teachings of the present invention.

To illustrate, FIG. 1 shows one example of an imaging system 100 having a pixel array including high dynamic range pixel circuits in accordance with the teachings of the present invention. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

As will be discussed in various examples, each pixel circuit 104 includes a first photodiode having a higher sensitivity to light, and a second photodiode having a lower sensitivity to light. The first photodiode may be configured for low light detection while the second photodiode may be configured to bright light detection. The full well capacity (or charge accumulation capacity) of the first photodiode and the second photodiode may be configured to be different, for example, the first photodiode may be configured to have a full well capacity greater than that of the second photodiode. It may be preferable to have the second photodiode sensing more light than the first photodiode, thus in some embodiments, the full well capacity of the second photodiode may be configured to be greater than that of the first photodiode. Each pixel circuit 104 further includes first, second, and third floating diffusions coupled to the first and second photodiodes, a capacitor coupled to the third floating diffusion, a dual floating diffusion transistor coupled between the first and second floating diffusions, a capacitor readout transistor coupled between the second and third floating diffusions, an overflow transistor coupled between the second photodiode and the third floating diffusion, and an anti-blooming transistor coupled to the first photodiode. In operation, charge photogenerated by the first and second photodiodes may be readout from the pixel circuit 104 via multiple readout signals having different conversion gains to provide high dynamic range in accordance with the teachings of the present invention. In the various examples, the readout circuit 106 may be configured to readout the signals from the pixel circuits 104 of pixel array 102 through column bitlines 112. In various examples, readout circuit 106 may include current sources, routing circuitry, and comparators that may be included in analog to digital converters or otherwise.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 is implemented on a single semiconductor wafer. In another example, imaging system 100 is on stacked semiconductor wafers. For example, pixel array 102 is implemented on a pixel wafer or a sensor wafer, and readout circuit 106, control circuit 110 and function logic 108 are implemented on an application specific integrated circuit (ASIC) wafer, where the pixel wafer and the ASIC wafer are stacked and interconnected by bonding (hybrid bonding, oxide bonding, or the like) or one or more through substrate vias (TSVs). For another example, pixel array 102 and control circuit 110 are implemented on a pixel wafer, and array of capacitors, readout circuit 106, and function logic 108 are implemented on an ASIC wafer, where the pixel wafer and the ASIC wafer are stacked and interconnected by bonding (hybrid bonding, oxide bonding, or the like) or one or more through substrate vias (TSVs). In another example, portions of each pixel 104, including for example the first and second photodiodes, the transfer transistors, the overflow transistors and the anti-blooming transistors are included in a first wafer, while the array of capacitors, the capacitor readout transistors are included in a second wafer, and the control circuitry and ASIC circuitry are included in a third wafer that is stacked with the first and second wafers, etc.

In one example, imaging system 100 may be included in a digital camera, cell phone, laptop computer, an endoscope, a security camera, an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2A:
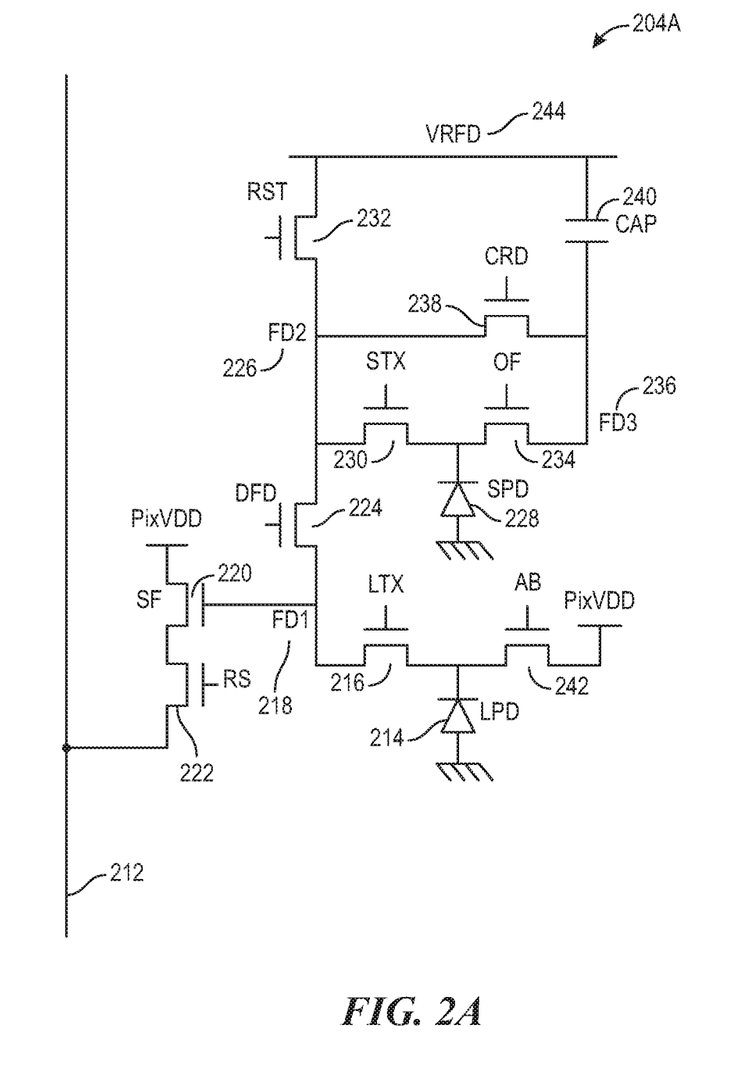
FIG. 2A illustrates a schematic of one example of a high dynamic range pixel circuit in accordance with the teachings of the present disclosure.

FIG. 2A illustrates a schematic of one example of a high dynamic range pixel circuit 204A in accordance with the teachings of the present disclosure. It is appreciated that the pixel circuit 204A of FIG. 2A may be an example of one of the pixel circuits 104 included in pixel array 102 as shown in FIG. 1, and that similarly named and numbered elements described above are coupled and function similarly below.

As shown in the depicted example, pixel circuit 204A includes a first photodiode 214 and a second photodiode 228 that are configured to photogenerate charge (e.g., electrons or holes) in response to incident light. In one example, the first photodiode 214 has a larger sensing area and may therefore be referred to as larger photodiode (LPD) that has a higher sensitivity to light. In the example, the second photodiode 228 has smaller sensing area and may therefore be referred to as a small photodiode (SPD) that has a lower sensitivity to light compared to the first photodiode LPD 214. The second photodiode 228 may be configured for sensing bright or strong light. The first photodiode 214 and the second photodiode 228 may be configured to have different full well capacity such as different implant configurations (e.g., dosage, implant energy that result in having different volume of depletion region. As shown in the example, a first transfer transistor 216 is coupled to the first photodiode LPD 214, and a first floating diffusion FD1 218 is coupled to the first transfer transistor 216. In one example, the first transfer transistor 216 is controlled in response to a first transfer control signal LTX to control the transfer of charge from the first photodiode LPD 214 to the first floating diffusion FD1 218. A second transfer transistor 230 coupled to the second photodiode SPD 228, and a second floating diffusion FD2 226 is coupled to the second transfer transistor 230. In one example, the second transfer transistor 230 is controlled in response to a second transfer control signal STX to control the transfer of charge from the second photodiode SPD 228 to the second floating diffusion FD2 228. The second floating diffusion FD2 228 may be further coupled to a junction capacitor that is combined with a metal capacitor or a metal oxide semiconductor capacitor (MOSCAP) for charge storage.

Continuing with the depicted example, a dual floating diffusion transistor 224 coupled between the first floating diffusion FD1 218 and the second floating diffusion FD2 226. In one example, the dual floating diffusion transistor 224 is controlled in response to a dual floating diffusion signal DFD to control the transfer of charge between the first floating diffusion FD1 218 and the second floating diffusion FD2 226. In one example, an overflow transistor 234 is coupled to the second photodiode SPD 228, and a third floating diffusion FD3 236 is coupled to the overflow transistor 234. In one example, the overflow transistor 234 is controlled in response to an overflow control signal OF. As shown in the depicted example, a capacitor CAP 240 is coupled between a voltage source VRFD 244 and the third floating diffusion FD3 236, which is coupled to the overflow transistor 234. In one example, a top capacitor electrode of the capacitor CAP 240 is coupled to the voltage source VRFD 244 and a bottom capacitor electrode of the capacitor CAP 240 is coupled to the third floating diffusion FD3 236 and the overflow transistor 234.

A capacitor readout transistor 238 is coupled between the third floating diffusion FD3 236, which is coupled to the capacitor CAP 240, and the second floating diffusion FD2 226. An anti-blooming transistor 242 is coupled between the first photodiode LPD 214 and a power line PixVDD. A gate of a source follower transistor 220 is coupled to the first floating diffusion FD1 218. A row select transistor 222 is coupled to the source follower transistor 220. As shown in the depicted example, the source follower transistor 220 and the row select transistor 222 are coupled between the power line PixVDD and a bitline 212.

In the example depicted in FIG. 2A, a reset transistor 232 is coupled between the voltage source VRFD 244 and the second floating diffusion FD2 226. In the depicted example, the row select transistor 222 is configured to be controlled in response to a row select signal RS and the reset transistor 232 is configured to be controlled in response to a reset signal RST. A signal may be readout from the pixel circuit 204A through the bitline 212 and row select transistor 222 in response to the charge at the gate of the source follower transistor 220. In operation, charge photogenerated by the first photodiode LPD 214 and the second photodiode SPD 228 may be readout from the pixel circuit 204A through bitline 212 via multiple readout signals having different conversion gains to provide high dynamic range in accordance with the teachings of the present invention.

In the depicted example, charge is photogenerated in the first photodiode LPD 214 and the second photodiode SPD 228 in response to incident light. In the example, the first photodiode LPD 214 is configured for low light (e.g., dim light) sensing and the second photodiode SPD 228 is configured for strong light (e.g., bright light) sensing. During integration, excess photogenerated charges from the first photodiode LPD 214 are configured to drain out from the first floating diffusion FD1 218 and through the dual floating diffusion transistor 224 to the second floating diffusion FD2 226 and may also be drained through the reset transistor 232 to the voltage supply VRFD 244. Excess photogenerated charges from the second photodiode SPD 228 are configured to overflow through the overflow transistor 234, even when overflow transistor 234 is turned off, to the third floating diffusion FD3 236 to the capacitor CAP 240. In one example, the overflow transistor 234 may be configured to be leakier than the second transfer transistor 230 during integration. In various example, the gate bias voltage applied to the gate of overflow transistor 234 may be greater than the gate bias voltage applied to the second transfer transistor 230 and/or the overflow transistor 234 may be configured with an additional channel implant to provide a leakage path between the second photodiode SPD 228 and the capacitor CAP 240 for excess photogenerated charges during integration. In various examples, the capacitor CAP 240 is a lateral overflow integration capacitor (LOFIC) that may be implemented with a metal-oxide-semiconductor capacitor (MOSCAP), a metal-insulator-metal (MIM) capacitor, a high k MIM capacitor, or the like. In one example, a capacitance of the capacitor CAP 240 is configured to be greater than a capacitance associated with second floating diffusion FD2 226 and a capacitance associated with the first floating first floating diffusion FD1 218.

Continuing with the depicted example, the anti-blooming transistor 242 is configured to be turned on to disable the first photodiode LPD 214 or drain the first photodiode LPD 214 of photogenerated charges during a readout of the second photodiode SPD 228. As such, photogenerated charges from the first photodiode LPD 214 are prevented from interfering with the readout of photogenerated charges from the second photodiode SPD 228 affecting sensitivity of the second photodiode SPD 228. In various examples, it is appreciated that even though readout times of the second photodiode SPD 228 may be in the order of microseconds, the first photodiode LPD 214 could still saturate and overflow to the first floating diffusion FD1 218, which would negatively affect the readout of the second photodiode SPD 228 without the anti-blooming transistor 242.

As will be discussed, in the depicted example, the capacitor readout transistor 238 is configured to selectively couple the capacitor CAP 240 and third floating diffusion FD3 236 to the second floating diffusion FD2 226 to modulate the effective capacitance associated with the second photodiode SPD 228 to provide middle conversion gain (MCG) readout signals of charge from the second photodiode SPD 228. It is appreciated therefore that when the capacitor readout transistor 238 is turned on, excess photogenerated charges from the second photodiode SPD 228 that are stored in the capacitor CAP 240 and the third floating diffusion FD3 236 can be readout through the second floating diffusion FD2 226 to the first floating diffusion FD1 218.

In operation, the reset transistor 232 is configured to selectively reset the pixel circuit 204A. For instance, when turned on, charge in the first photodiode LPD 214, the second photodiode SPD 228, the first floating diffusion FD1 218, the second floating diffusion FD2 226, the third floating diffusion FD3 236, and/or the capacitor CAP 240 may be discharged through the reset capacitor 232 to the voltage source VRFD 244 resetting the first photodiode LPD 214, the second photodiode SPD 228, the first floating diffusion FD1 218, the second floating diffusion FD2 226, the third floating diffusion FD3 236.

Figure 2B:
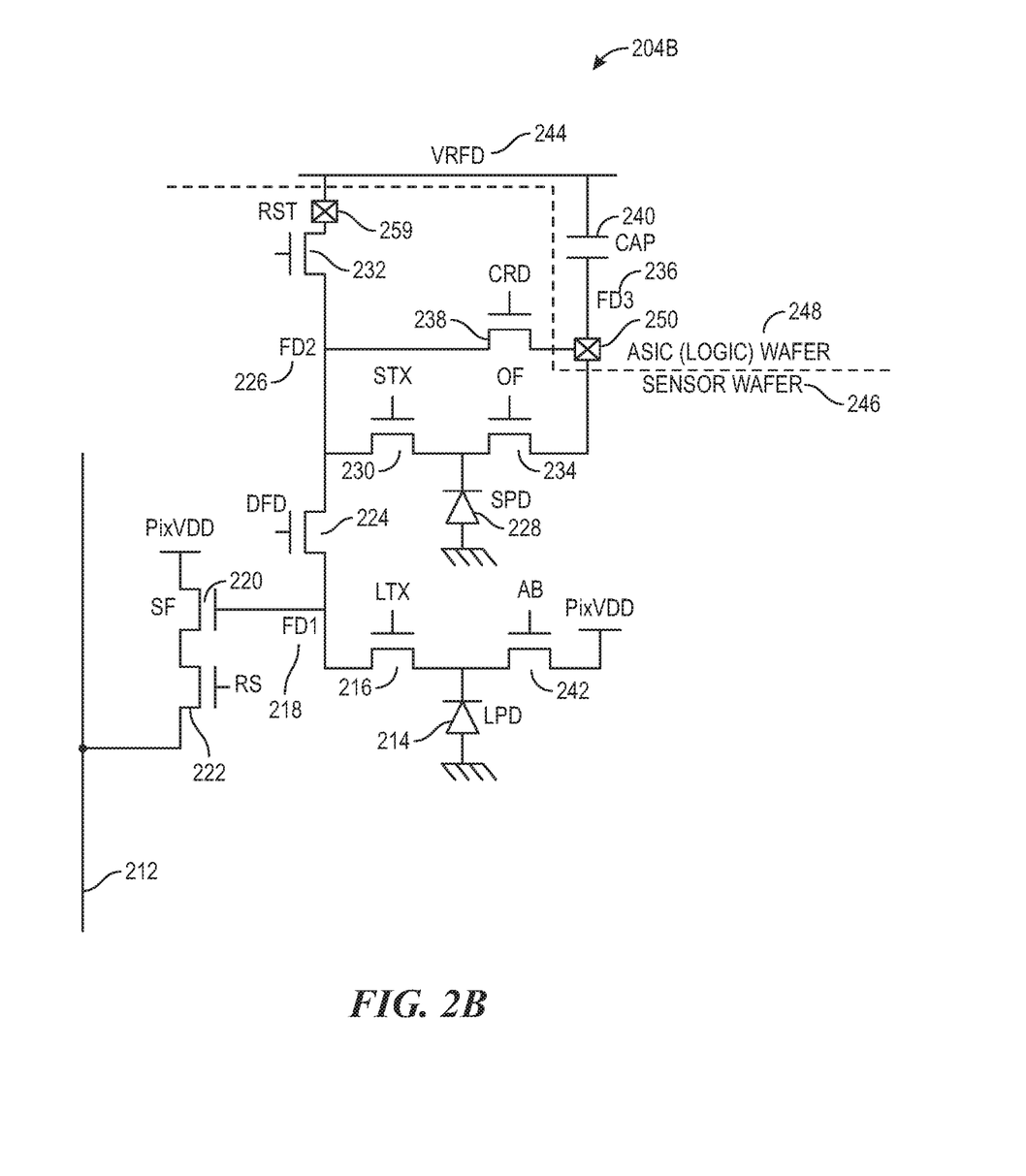
FIG. 2B illustrates a schematic of another example of a high dynamic range pixel circuit in accordance with the teachings of the present disclosure.

In one example, it is appreciated that the circuit elements of pixel circuit 204A as described in FIG. 2A may all be included in a single wafer or semiconductor die. It is appreciated that in other examples, one or more elements of the pixel circuit 204A may be included in two or more stacked wafers coupled to one another. To illustrate, FIG. 2B illustrates a schematic of another example of a high dynamic range pixel circuit 204B in accordance with the teachings of the present disclosure. It is appreciated that the pixel circuit 204B of FIG. 2B may be another example of one of the pixel circuits 104 included in pixel array 102 as shown in FIG. 1, and that similarly named and numbered elements described above are coupled and function similarly below. It is also appreciated that the pixel circuit 204B depicted in FIG. 2B is substantially similar to the pixel circuit 204A depicted in FIG. 2A discussed in detail above. As such, it is appreciated that operation of pixel circuit 204B of FIG. 2B is also similar to operation of pixel circuit 204A of FIG. 2A. As will be shown, one of the differences between pixel circuit 204B of FIG. 2B and pixel circuit 204A of FIG. 2A is that the circuit elements of the example pixel circuit 204B as illustrated in FIG. 2B are included among two wafers instead of a single wafer as depicted in the example pixel circuit 204A of FIG. 2A.

As shown in the example depicted in FIG. 2B, pixel circuit 204B includes circuit elements that are included among a first wafer 246 (e.g., sensor wafer) and a second wafer 248 (e.g., an application specific integrated circuit (ASIC) wafer or a logic wafer). In one example, the first wafer 246 and the second wafer 248 are coupled together or stacked together in a stacked chip scheme to provide a complementary metal oxide semiconductor (CMOS) image sensor (CIS) in accordance with the teachings of the present invention.

As shown in the depicted example, the overflow transistor 234 is included in the first wafer 246 while at least a part of the third floating diffusion FD3 236 and the capacitor CAP 240 are included in the second wafer 248. In the example, the overflow transistor 234 is coupled to the third floating diffusion FD3 236 and capacitor CAP 240 through a first hybrid bond 250 between the first wafer 246 and the second wafer 248.

In the example depicted in FIG. 2B, the first wafer 246 further includes the first photodiode LPD 214 and the second photodiode SPD 228, the first transfer transistor 216, the second transfer transistor 230, the first floating diffusion FD1 218, and the anti-blooming transistor 242. In the depicted example, the first wafer 246 further includes the capacitor readout transistor 238, which is also coupled to the third floating diffusion FD3 236 and capacitor CAP 240 through the first hybrid bond 250 between the first wafer 246 and the second wafer 248. As shown in the depicted example, the first wafer 246 also includes the reset transistor 232, the second floating diffusion FD2 226, the dual floating diffusion transistor 224, the source follower transistor 220, and the row select transistor 222. In the depicted example, the reset transistor is coupled to the voltage source VRFD 244 through the hybrid bond 259 between the first wafer 246 and the second wafer 248. The second wafer 248 may further include one or more additional readout circuit components such as current sources, routing circuitry, and comparators that may be included in analog to digital converters, control circuitries, and signal processing circuitries.

In the various examples, it is appreciated that operation of the pixel circuit 204B depicted in FIG. 2B is similar to operation of the example pixel circuit 204A depicted in FIG. 2A except that the circuit elements of example pixel circuit 204B are included in two wafers (e.g., first wafer 246 and second wafer 248) while the circuit elements of example pixel circuit 204A are included in a single wafer in accordance with the teachings of the present invention.

Figure 2C:
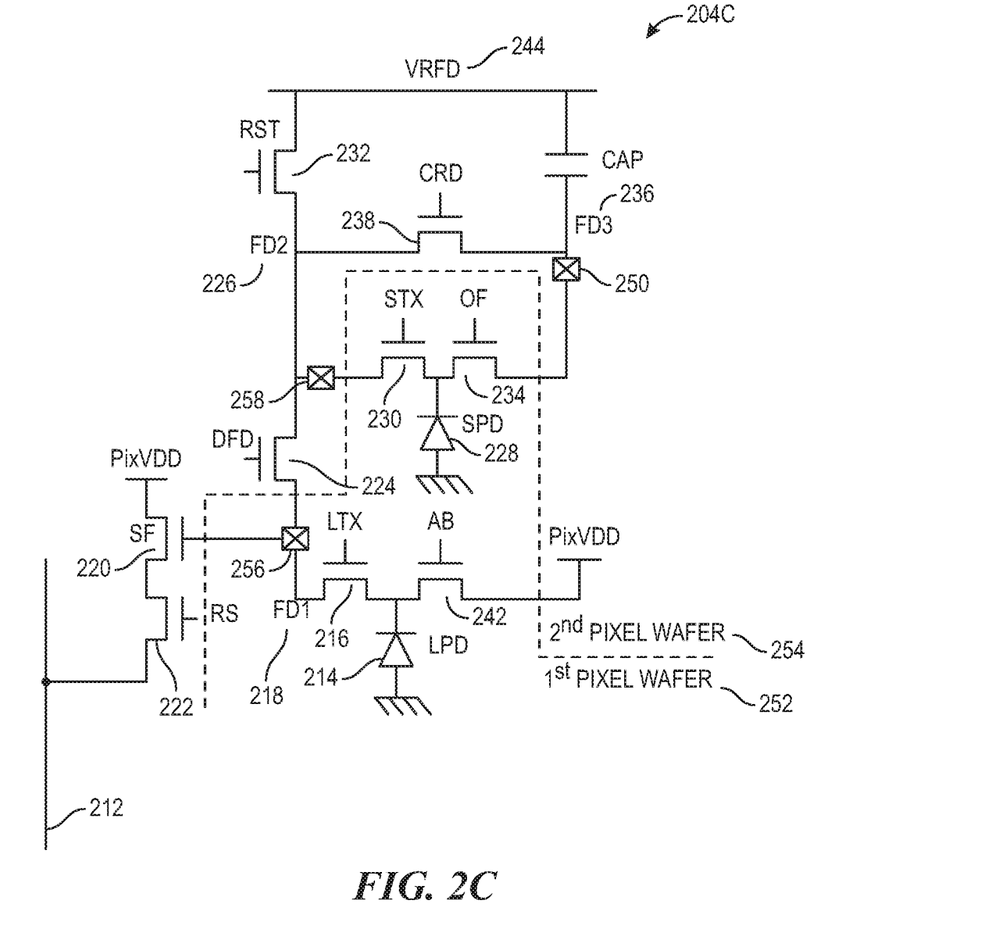
FIG. 2C illustrates a schematic of yet another example of a high dynamic range pixel circuit in accordance with the teachings of the present disclosure.

FIG. 2C illustrates a schematic of yet another example of a high dynamic range pixel circuit 204C in accordance with the teachings of the present disclosure. It is appreciated that the pixel circuit 204C of FIG. 2C may be another example of one of the pixel circuits 104 included in pixel array 102 as shown in FIG. 1, and that similarly named and numbered elements described above are coupled and function similarly below. It is also appreciated that the pixel circuit 204C depicted in FIG. 2C is substantially similar to the pixel circuit 204A depicted in FIG. 2A and/or pixel circuit 204B depicted in FIG. 2B discussed in detail above. As such, it is appreciated that operation of pixel circuit 204C of FIG. 2C is also similar to operation of pixel circuit 204A of FIG. 2A and/or pixel circuit 204B of FIG. 2B. As will be shown, one of the differences between pixel circuit 204C of FIG. 2C and pixel circuit 204B of FIG. 2B is that the distribution of circuit elements of the example pixel circuit 204C as illustrated in FIG. 2C are different than the distribution of circuit elements of pixel circuit 204B of FIG. 2B.

To illustrate, as shown in the example depicted in FIG. 2C, pixel circuit 204C includes circuit elements that are included among a first wafer 246 (e.g., a sensor wafer) and a second wafer 248 (e.g., a logic wafer). In one example, the first wafer 246 and the second wafer 248 are coupled together or stacked together in a stacked chip scheme to provide a complementary metal oxide semiconductor (CMOS) image sensor (CIS) in accordance with the teachings of the present invention. In one example, a second wafer may further include column circuitry, row circuitry, control circuitry, ASIC processing circuitry, etc.

Continuing with the example depicted in FIG. 2C, the overflow transistor 234 is included in the first wafer 246 while the third floating diffusion FD3 236 and the capacitor CAP 240 are included in the second wafer 248. In the example, the overflow transistor 234 is coupled to the third floating diffusion FD3 236 and capacitor CAP 240 through a first hybrid bond 250 between the first wafer 246 and the second wafer 248.

In the example depicted in FIG. 2C, the first wafer 246 further includes the first photodiode LPD 214 and the second photodiode SPD 228, the first transfer transistor 216, the second transfer transistor 230, the first floating diffusion FD1 218, and the anti-blooming transistor 242. In the depicted example, the second wafer 248 further includes the capacitor readout transistor 238, the reset transistor 232, the second floating diffusion FD2 226, the dual floating diffusion transistor 234, the source follower transistor 220, and the row select transistor 222. As depicted in the example shown in FIG. 2C, the first floating diffusion FD1 218 may be coupled to the gate of the source follower transistor 220 and the dual floating diffusion transistor 234 through a second hybrid bond 256 between the first wafer 252 and the second wafer 254. In addition, the example depicted in FIG. 2C shows that the second transfer transistor 230 may be coupled to the second floating diffusion FD2 236 through a third hybrid bond 258 between the first wafer 252 and the second wafer 254.

It is appreciated in a further example, a third stacked wafer may be implemented where the two wafers depicted in FIG. 2C may be two wafers of at least three wafers of a stacked chip scheme in accordance with the teachings of the present invention. In such example, a third wafer may be coupled to and stacked with the first wafer 246 and the second wafer 248, where the third wafer may be a logic wafer that may include for example column circuitry, row circuitry, control circuitry, memory circuitry, ASIC processing circuitry, etc.

In the various examples, it is appreciated that operation of the pixel circuit 204C depicted in FIG. 2C is similar to operation of the example pixel circuit 204A depicted in FIG. 2A and/or the example pixel circuit 204B depicted in FIG. 2B, except that the distribution of the circuit elements of example pixel circuit 204C among the two wafers (e.g., first wafer 246 and second wafer 248) is different than the distribution of the circuit elements among the one or more wafers is as discussed in detail above with respect to example pixel circuit 204A as shown in FIG. 2A and/or example pixel circuit 204B as shown in FIG. 2B in accordance with the teachings of the present invention.

Figure 3:
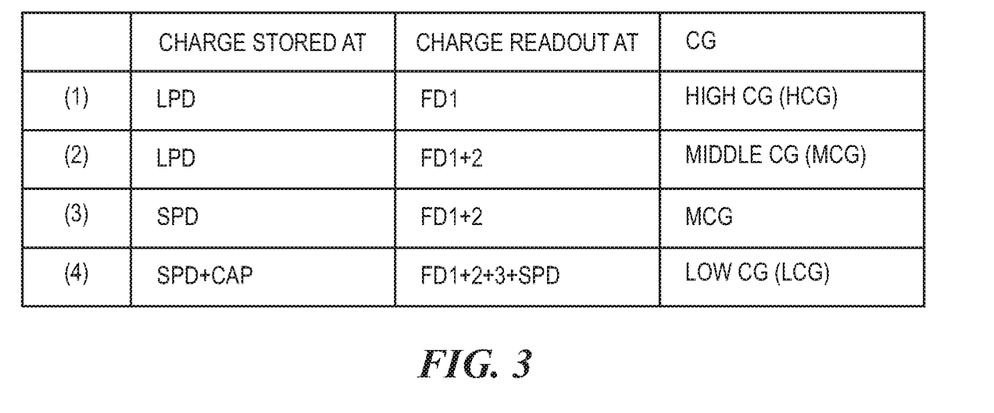
FIG. 3 shows a table illustrating examples of four different readout signal gain settings from an example pixel circuit in accordance with the teachings of the present disclosure.

FIG. 3 shows a table illustrating examples of four different readout signal gain settings from an example pixel circuit in accordance with the teachings of the present disclosure. It is appreciated that the four different readout signal gain settings depicted in the example shown in FIG. 3 may apply to any one of the example pixel circuits described in this disclosure including for example pixel circuits 204A, 204B, and/or 204C described in detail above in FIG. 2A, FIG. 2B, and/or FIG. 2C in accordance with the teachings of the present invention.

As shown in FIG. 3, in a first readout gain setting example, the charge stored at a larger photodiode (e.g., first photodiode LPD 214) may be readout from a first floating diffusion (e.g., first floating diffusion FD1 218) to provide a high conversion gain (HCG) readout associated with the larger photodiode (e.g., first photodiode LPD 214 for low light detection) in accordance with the teachings of the present invention. In the various examples, the charge stored at the first floating diffusion FD1 218 is readout via the source follower transistor 220 and through the row select transistor 222 through bitline 212.

The example depicted in FIG. 3 shows that in a second readout gain setting example, the charge stored at the larger photodiode (e.g., first photodiode LPD 214) may be readout from the first floating diffusion (e.g., first floating diffusion FD1 218) and from the second floating diffusion (e.g., second floating diffusion FD2 226) to provide a middle conversion gain (MCG) readout associated with large photodiode (e.g., first photodiode LPD 214 for low light detection) having a medium conversion gain that is smaller than a high conversion gain associated with the high conversion gain (HCG) readout in accordance with the teachings of the present invention. In the various examples, the charges stored at the first floating diffusion FD1 218 and at the second floating diffusion FD2 226 are readout via the dual floating diffusion transistor 224, the source follower transistor 220, and through the through the row select transistor 222 through bitline 212.

The example depicted in FIG. 3 further shows that in a third readout gain setting example, the charge stored at a small photodiode (e.g., second photodiode SPD 228) may be readout from the first floating diffusion (e.g., first floating diffusion FD1 218) and from the second floating diffusion (e.g., second floating diffusion FD2 226) to provide another middle conversion gain (MCG) readout associated with the small photodiode (e.g., second photodiode SPD 228 for bright light detection) in accordance with the teachings of the present invention. The conversion gain associated with the middle conversion gain (MCG) readout for the small photodiode (e.g., second photodiode SPD 228) may be smaller than the high conversion gain associated with the high conversion gain (HCG) readout for larger photodiode (e.g., first photodiode LPD 214). In the various examples, the charges stored at the first floating diffusion FD1 218 and at the second floating diffusion FD2 226 are readout via the dual floating diffusion transistor 224, the source follower transistor 220, and through the row select transistor 222 through bitline 212. In various examples, the anti-blooming transistor 242 may be turned on during the readout of the second photodiode SPD 228 to disable the first photodiode LPD 214 or to drain the first photodiode LPD 214 of charge, which therefore prevents any photogenerated charges from the first photodiode LPD 214 in response to incident light from affecting the readout operation of the second photodiode SPD 228 in accordance with the teachings of the present invention.

The example depicted in FIG. 3 also shows that in a fourth readout gain setting example, the charge stored at the small photodiode (e.g., second photodiode SPD 228) and a capacitor (e.g., capacitor CAP 236) may be readout from the first floating diffusion (e.g., first floating diffusion FD1 218), from the second floating diffusion (e.g., second floating diffusion FD2 226), and from the third floating diffusion (e.g., third floating diffusion FD3 236) to provide a low conversion gain (LCG) readout associated with the small photodiode (e.g., second photodiode SPD 228 for bright light detection) in accordance with the teachings of the present invention. The conversion gain associated with the low conversion gain (LCG) readout for the small photodiode (e.g., second photodiode SPD 228) is smaller than the conversion gain associated with the middle conversion gain (MCG) readout for small photodiode (e.g., second photodiode SPD 228). In the various examples, the charge stored at the first floating diffusion FD1 218, the second floating diffusion FD2 226, and the third floating diffusion FD3 236 is readout via the dual floating diffusion transistor 224, the capacitor readout transistor 238, the source follower transistor 220, and through the through the row select transistor 222 through bitline 212. In various examples, the anti-blooming transistor 242 may be turned on during the readout of the second photodiode SPD 228 to disable the first photodiode LPD 214 or to drain the first photodiode LPD 214 of charge (e.g., charge photogenerated by first photodiode LPD 214 during readout of second photodiode SPD 228), which therefore prevents the charges from the first photodiode LPD 214 from affecting the readout of the second photodiode SPD 228 in accordance with the teachings of the present invention.

Figure 4:
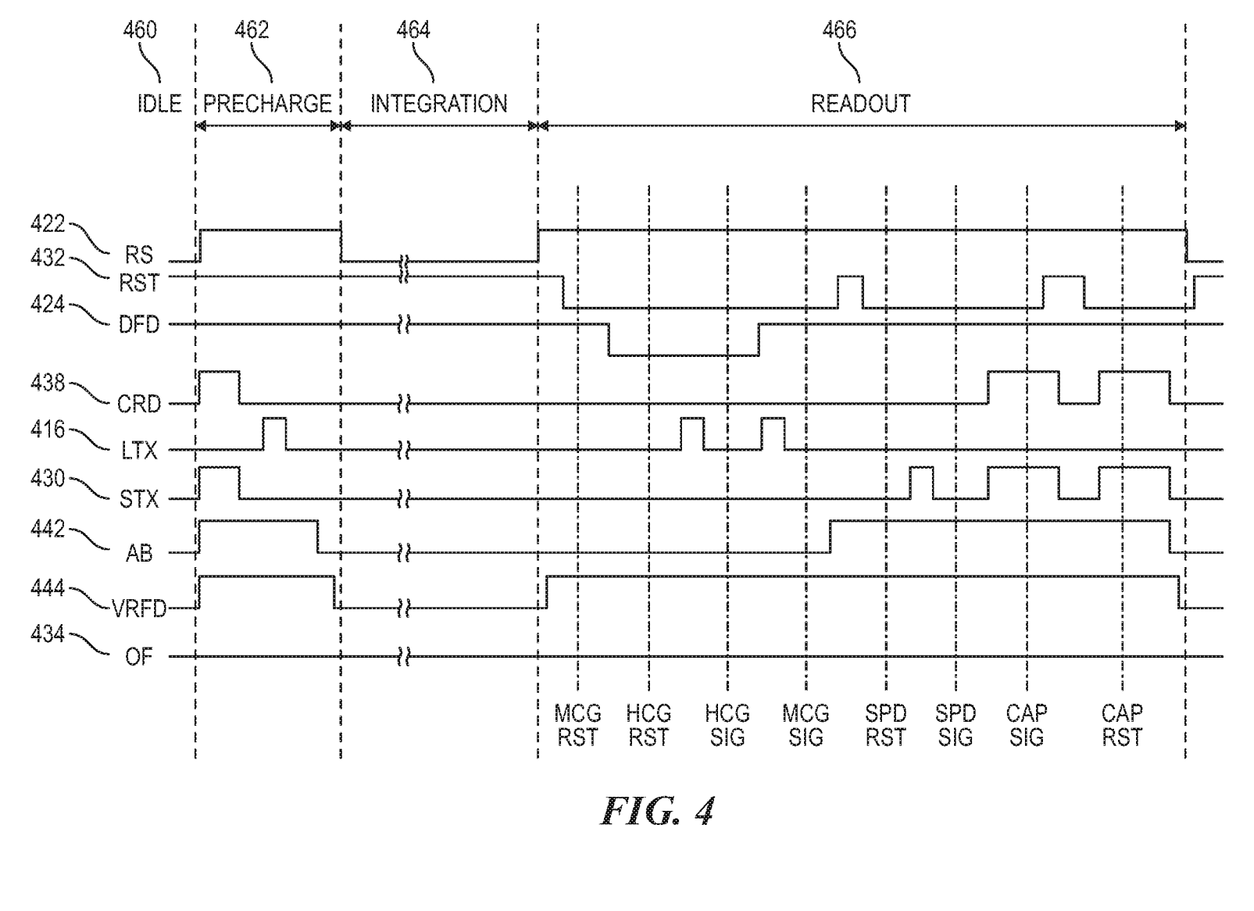
FIG. 4 shows a timing diagram illustrating examples of the readout of signals and reset signals at four different gain settings from an example pixel circuit in accordance with the teachings of the present disclosure.

FIG. 4 shows a timing diagram illustrating examples of the readout of signals and reset signals at four different conversion gain settings from an example pixel circuit in accordance with the teachings of the present disclosure. It is appreciated that signals depicted in the example timing diagram shown in FIG. 3 may apply to any one of the example pixel circuits described in this disclosure including for example pixel circuits 204A, 204B, and/or 204C described in detail above in FIG. 2A, FIG. 2B, and/or FIG. 2C in accordance with the teachings of the present invention.

As shown, the example depicted in FIG. 4 illustrates a row select signal RS 422, a reset signal RST 432, a dual floating diffusion signal DFD 424, a capacitor readout signal CRD 438, a large transfer control signal LTX 416, a small transfer control signal STX 430, an anti-blooming signal AB 442, a voltage source signal VRFD 444, and an overflow signal OF 434. The example depicted in FIG. 4 shows that an idle period 460 is followed by a precharge period 462, which is followed by an integration period 464, which is followed by a readout period 466.

The timing diagram example shown in FIG. 4 shows that during the idle period 460, the row select signal RS 422, the capacitor readout signal CRD 438, the large transfer control signal LTX 416, the small transfer control signal STX 430, the anti-blooming signal AB 442, the voltage source signal VRFD 444, and the overflow signal OF 434 are at a low value and that the reset signal RST 432 and the dual floating diffusion signal DFD 424 are at a high value.

Next, during the precharge period 462, the row select signal RS 422, the capacitor readout signal CRD 438, the small transfer control signal STX 430, the anti-blooming signal AB 442, and the voltage source signal VRFD 444 transition to a high level allowing the associated pixel circuit to be reset. Next, the capacitor readout signal CRD 438 and the small transfer control signal STX 430 transition to the low level and the large transfer control signal LTX 416 is pulsed, and then the anti-blooming signal AB 442 transitions to the low level, and then the voltage source signal VRFD 444 transitions to the low level, and then the row select signal RS 422 transitions to the low level to prepare the pixel circuit for integration.

Next, during the integration period 464, the row select signal RS 422, the capacitor readout signal CRD 438, the large transfer control signal LTX 416, the small transfer control signal STX 430, the anti-blooming signal AB 442, the voltage source signal VRFD 444, and the overflow signal OF 434 are at the low value and that the reset signal RST 432 and the dual floating diffusion signal DFD 424 are at the high value. The low value level of the overflow signal OF 434 may be configured to be the same or different as the low value level of the small transfer control signal STX 430. In one example, the low value of the overflow signal OF 434 may be greater than the low value level of the small transfer control signal STX 430. As such, when a first or large photodiode (e.g., first photodiode LPD 214) saturates, excess charges photogenerated by the corresponding first or large photodiode (e.g., first photodiode LPD 214) that overflow to the first floating diffusion (e.g., first floating diffusion FD1 218) will be drain out from the first floating diffusion FD1 218 and through the dual floating diffusion transistor 224, the second floating diffusion FD2 226 and the reset transistor 232 to the voltage supply VRFD 244. Meanwhile, when a second or small photodiode (e.g., second photodiode SPD 228) saturates, excess charges photogenerated by the corresponding second or small photodiode (e.g., second photodiode SPD 228) will overflow to the capacitor CAP 240 for storage through the third floating diffusion FD3 236.

Next, during the readout period 466, the row select signal RS 422 transitions to the high level, and then the voltage source signal VRFD 444 transitions to the high level, and then the reset signal RST 432 transitions to the low level. Next, a LPD's middle conversion gain reset signal value (LPD's MCG RST) may be readout from the pixel circuit.

Next, the dual floating diffusion signal DFD 424 transitions to the low value, and then a high conversion gain reset signal value (HCG RST) may be readout from the pixel circuit.

Next, the large transfer control signal LTX 416 is pulsed, and then a high conversion gain signal value (HCG SIG) associated with the first or large photodiode (e.g., first photodiode LPD 214) may be readout from the pixel circuit.

Next, the dual floating diffusion signal DFD 424 transitions to the high value and the large transfer control signal LTX 416 is pulsed, and then a LPD's middle conversion gain signal value (LPD's MCG SIG) associated with first or large photodiode (e.g., first photodiode LPD 214) may be readout from the pixel circuit.

Next, the anti-blooming signal AB transitions to the high level and the reset signal is pulsed. Next, a small photodiode reset signal (SPD RST) is readout.

Next, the small transfer control signal STX 430 is pulsed and then a small photodiode signal value (SPD SIG), which may correspond to SPD's middle conversion gain signal value, is readout. This signal may include charge(s) transferred to first and second floating diffusions as depicted in the third readout gain setting in FIG. 3.

Next, the capacitor readout signal CRD 438 and the small transfer control signal STX 430 transition to the high value and then a capacitor signal value (CAP SIG) value, which may correspond to SPD's low conversion gain signal value is readout. This signal may include photogenerated charges accumulated and stored in the small photodiode (SPD) as well as excess photogenerated charges overflowed and stored in the associated capacitor as depicted in the fourth readout gain setting in FIG. 3.

Next, the reset signal RST 432 is pulsed, and the capacitor readout signal CRD 438 and the small transfer control signal STX 430 transition to the low value. Next, after the reset signal RST 432 is pulse is complete, the capacitor readout signal CRD 438 and the small transfer control signal STX 430 transition back to the high value, Next, a capacitor reset signal value (CAP RST) is readout. Next, the capacitor readout signal CRD 438, the small transfer control signal STX 430, the anti-blooming signal AB 442, and then the voltage source signal VRFD 444, and then the row select signal transition to the low value to complete the readout period 466. It is appreciated that in the illustrated example, the anti-blooming signal AB 442 stays at a high value (e.g., turning the associated anti-blooming transistor 242) during the entire readout operation of the second or small photodiode (e.g., second photodiode SPD 228) including the read out period of the capacitor signal value (CAP SIG) and the capacitor reset signal value (CAP RST) associated with the second or small photodiode (e.g., second photodiode SPD 228) to avoid charges from the first or large photodiode (e.g., first photodiode LPD 214) from interfering with the photodiode (or image) signal associated with the second or small photodiode (e.g., second photodiode SPD 228).

It is appreciated that in the various examples, a correlated double sampling (CDS) value for the LPD's middle conversion gain (LPD-MCG) signal value can be determined in response to the difference between the LPD's middle conversion gain signal value (LPD's MCG SIG) and the LPD's middle conversion gain reset signal value (LPD's MCG RST). A CDS value for the high conversion gain (HCG) signal value associated with first or large photodiode can be determined in response to the difference between the high conversion gain signal value (HCG SIG) and the high conversion gain reset signal value (HCG RST). A CDS value for the small photodiode (SPD) signal value with middle conversion gain associated with second or small photodiode (e.g., second photodiode SPD 228) can be determined in response to the difference between the small photodiode signal value (SPD SIG) and the small photodiode reset signal value (SPD RST). A low conversion gain (SPD LCG) signal value for the capacitor (CAP) signal value can be determined in response to the difference between the capacitor signal value (CAP SIG) and the capacitor reset signal value (CAP RST) read out after the capacitor signal value (CAP SIG). An image signal associated with the example pixel circuit can be then generated based on the high conversion gain signal value (HCG SIG) associated with first or large photodiode (e.g., first photodiode LPD 214), the middle conversion gain signal value (LPD MCG SIG) associated with first or large photodiode (e.g., first photodiode LPD 214), the small photodiode (SPD) signal value of middle conversion gain associated with second or small photodiode (e.g., second photodiode SPD 228), and the low conversion gain (SPD LCG) signal associated with second or small photodiode (e.g., second photodiode SPD 228), which can realize high dynamic range up to 140 dB through expanding dynamic range associated with bright light imaging portion.

Figure 5:
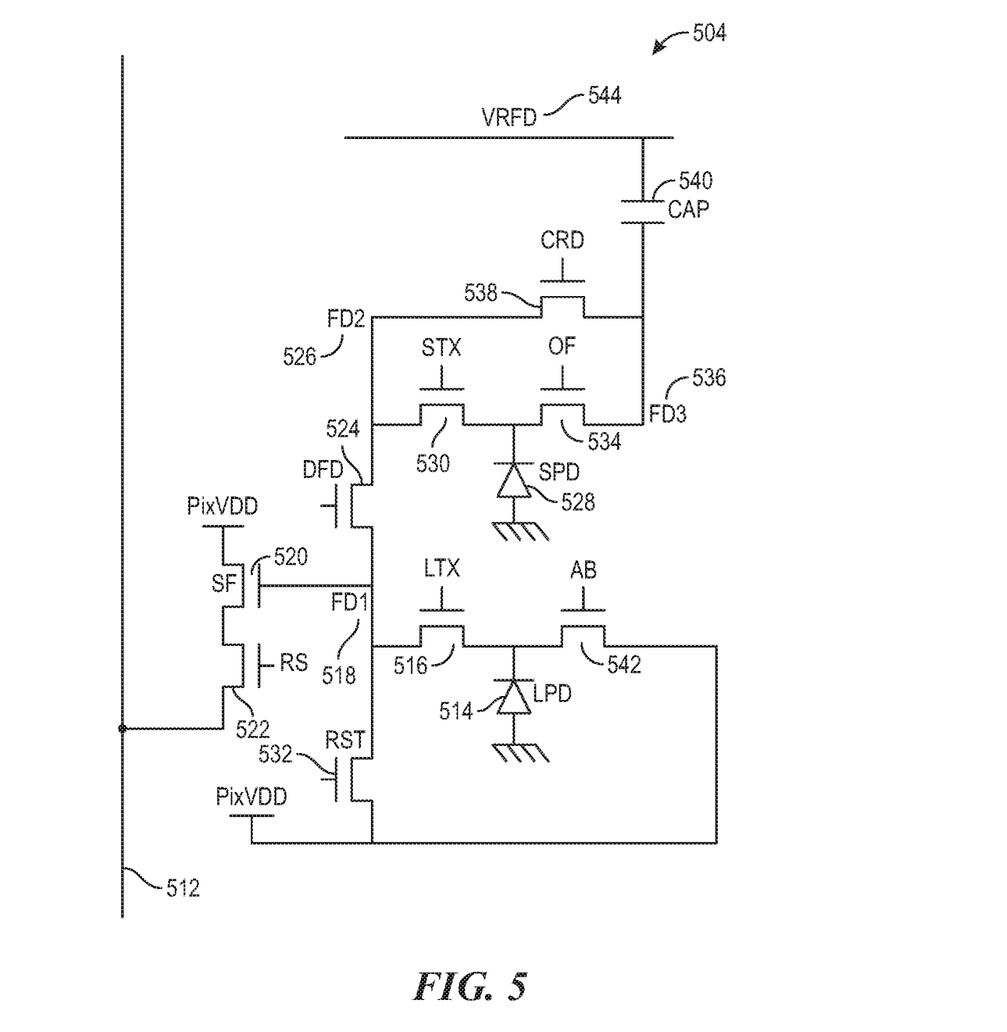
FIG. 5 illustrates a schematic of still another example of a high dynamic range pixel circuit in accordance with the teachings of the present disclosure.

FIG. 5 illustrates a schematic of still another example of a high dynamic range pixel circuit 504 in accordance with the teachings of the present disclosure. It is appreciated that the pixel circuit 504 of FIG. 5 may be another example of one of the pixel circuits 104 included in pixel array 102 as shown in FIG. 1, and that similarly named and numbered elements described above are coupled and function similarly below. It is also appreciated that the pixel circuit 504 depicted in FIG. 5 shares many similarities with the pixel circuit 204A depicted in FIG. 2A discussed in detail above. As such, it is appreciated that operation of pixel circuit 504 of FIG. 5 is also similar to operation of pixel circuit 204A of FIG. 2A. As will be shown, one of the differences between pixel circuit 504 of FIG. 5 and pixel circuit 204A of FIG. 2A is that the reset transistor 532 is coupled between the power line PixVDD and the first floating diffusion FD1 518.

In particular, as shown in the example depicted in FIG. 5, pixel circuit 504 includes a first photodiode 514 and a second photodiode 528 that are configured to photogenerate charge in response to incident light. In one example, the first photodiode 514 has a larger sensing area and may therefore be referred to as larger photodiode (LPD) that has a higher sensitivity to light and is configured for sensing low light. In the example, the second photodiode 528 has smaller sensing area and may therefore be referred to as a small photodiode (SPD) that has a lower sensitivity to light compared to the first photodiode 514 and is configured for sensing bright or strong light. As shown in the example, a first transfer transistor 516 is coupled to the first photodiode 514, and a first floating diffusion FD1 518 is coupled to the first transfer transistor 516. In one example, the first transfer transistor 516 is controlled in response to a first transfer control signal LTX. A second transfer transistor 530 coupled to the second photodiode 528, and a second floating diffusion FD2 526 is coupled to the second transfer transistor 530. In one example, the second transfer transistor 530 is controlled in response to a second transfer control signal STX.

Continuing with the depicted example, a dual floating diffusion transistor 524 coupled between the first floating diffusion FD1 518 and the second floating diffusion FD2 526. In one example, an overflow transistor 534 is coupled to the second photodiode 528 and a third floating diffusion FD3 536 is coupled to the overflow transistor 534. In one example, the overflow transistor 534 is controlled in response to an overflow control signal OF. As shown in the depicted example, a capacitor CAP 540 is coupled between a voltage source VRFD 544 and the third floating diffusion FD3 536, which is coupled to the overflow transistor 534. In addition, a capacitor readout transistor 538 is coupled between the third floating diffusion FD3 536, which is coupled to the capacitor CAP 540, and the second floating diffusion FD2 526. An anti-blooming transistor 542 coupled between the first photodiode 514 and a power line PixVDD. A gate of a source follower transistor 520 is coupled to the first floating diffusion FD1 518 and a row select transistor 522 is coupled to the source follower transistor 520. As shown in the depicted example, the source follower transistor 520 and the row select transistor 522 are coupled between the power line PixVDD and a bitline 512.

As mentioned, one of the differences between the example pixel circuit 504 of FIG. 5 and example pixel circuit 204A of FIG. 2A is the in the example pixel circuit 504 depicted in FIG. 5, a reset transistor 532 is coupled between the power line PixVDD and the first floating diffusion FD1 518. It is appreciated therefore that in the example depicted in FIG. 5, the anti-blooming transistor 542 is coupled between the drain of the reset transistor 532 and the first photodiode LPD 514. As such, in the depicted example, a common drain of the reset transistor 532 and the anti-blooming transistor 542 may be shared providing layout flexibility and pixel scaling in accordance with the teachings of the present invention.

In the depicted example, the row select transistor 522 is configured to be controlled in response to a row select signal RS and the reset transistor 532 is configured to be controlled in response to a reset signal RST. A signal may be readout from the pixel circuit 504 through the bitline 512 and row select transistor 522 in response to the charge at the gate of the source follower transistor 520. In operation, charge photogenerated by the first photodiode 514 and the second photodiode 528 may be readout from the pixel circuit 504 through bitline 512 via multiple readout signals having different gains to provide high dynamic range in accordance with the teachings of the present invention as also described in detail above.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel circuit, comprising:
   a first photodiode and a second photodiode, wherein the first and second photodiodes photogenerate charge in response to incident light;
   a first transfer transistor coupled to the first photodiode;
   a first floating diffusion coupled to the first transfer transistor;
   a second transfer transistor coupled to the second photodiode;
   a second floating diffusion coupled to the second transfer transistor;
   a dual floating diffusion transistor coupled between the first and second floating diffusions;
   an overflow transistor coupled to the second photodiode;
   a capacitor coupled between a voltage source and the overflow transistor;
   a capacitor readout transistor coupled between the capacitor and the second floating diffusion; and
   an anti-blooming transistor coupled between the first photodiode and a power line, wherein the anti-blooming transistor is configured to (a) be turned on to disable the first photodiode during a readout of the second photodiode and (b) be turned off for a readout of the first photodiode such that charge stored in the first photodiode can be read out during the readout of the first photodiode.

2. The pixel circuit of claim 1, further comprising:
   a source follower transistor having a gate coupled to the first floating diffusion; and
   a row select transistor coupled to the source follower transistor, wherein the source follower transistor and the row select transistor are coupled between the power line and a bitline.

3. The pixel circuit of claim 2, further comprising a reset transistor coupled between the power line and the first floating diffusion.

4. The pixel circuit of claim 2, further comprising a reset transistor coupled between the voltage source and the second floating diffusion.

5. The pixel circuit of claim 4, wherein the pixel circuit is included in a stacked complementary metal oxide semiconductor image sensor (CIS) system comprising at least a first wafer and a second wafer stacked with the first wafer.

6. The pixel circuit of claim 5, wherein the overflow transistor is included in the first wafer, wherein the capacitor is included in the second wafer, wherein the overflow transistor is coupled to the capacitor through a first hybrid bond between the first wafer and the second wafer.

7. The pixel circuit of claim 6, wherein the first wafer further includes the first and second photodiodes, the first and second transfer transistors, the first floating diffusion, and the anti-blooming transistor.

8. The pixel circuit of claim 7,
   wherein the first wafer further includes the capacitor readout transistor, wherein the capacitor readout transistor is coupled to the capacitor through the first hybrid bond between the first wafer and the second wafer,
   wherein the first wafer further comprises the reset transistor, the second floating diffusion, the dual floating diffusion transistor, the source follower transistor, and the row select transistor.

9. The pixel circuit of claim 7,
   wherein the second wafer further includes the capacitor readout transistor, the reset transistor, the second floating diffusion, the dual floating diffusion transistor, the source follower transistor, and the row select transistor,
   wherein the first floating diffusion is coupled to the gate of the source follower transistor and the dual floating diffusion transistor through a second hybrid bond between the first wafer and the second wafer,
   wherein the second transfer transistor is coupled to the second floating diffusion through a third hybrid bond between the first wafer and the second wafer.

10. The pixel circuit of claim 1, wherein the first photodiode has a first light sensitivity and the second photodiode has a second light sensitivity, wherein the first light sensitivity is greater than the second light sensitivity.

11. The pixel circuit of claim 1, wherein a first conversion gain signal is configured to be read out from the pixel circuit in response to the charge photogenerated by the first photodiode that is transferred to the first floating diffusion, wherein the dual floating diffusion transistor is configured to be turned off when the first conversion gain signal is read out from the pixel circuit.

12. The pixel circuit of claim 10, wherein a second conversion gain signal is configured to be read out from the pixel circuit in response to the charge photogenerated by the first photodiode that is transferred to the first floating diffusion and to the second floating diffusion, wherein the dual floating diffusion transistor is configured to be turned on and the capacitor readout transistor is configured to be turned off when the second conversion gain signal is read out from the pixel circuit.

13. The pixel circuit of claim 10, wherein a third conversion gain signal is configured to be read out from the pixel circuit in response to the charge photogenerated by the second photodiode that is transferred to the second floating diffusion and to the first floating diffusion, wherein the dual floating diffusion transistor and the anti-blooming transistor are configured to be turned on and the capacitor readout transistor is configured to be turned off when the third conversion gain signal is read out from the pixel circuit.

14. The pixel circuit of claim 1, wherein excess charge photogenerated by the second photodiode in response to a bright incident light is configured to overflow from the second photodiode to the capacitor through the overflow transistor.

15. The pixel circuit of claim 14, wherein a fourth conversion gain signal is configured to be read out from the pixel circuit in response to the charge photogenerated by the second photodiode that is transferred to the second floating diffusion and to the first floating diffusion and in response to the excess charge photogenerated by the second photodiode that has overflowed to the capacitor in response to the bright incident light, wherein the dual floating diffusion transistor, the capacitor readout transistor, and the anti-blooming transistor are configured to be turned on when the fourth conversion gain signal is read out from the pixel circuit.

16. An imaging system, comprising:
 a pixel array including a plurality of pixel circuit arranged in a plurality of rows and a plurality of columns, wherein each one of the pixel circuits includes:
  a first photodiode and a second photodiode, wherein the first and second photodiodes photogenerate charge in response to incident light;
  a first transfer transistor coupled to the first photodiode;
  a first floating diffusion coupled to the first transfer transistor;
  a second transfer transistor coupled to the second photodiode;
  a second floating diffusion coupled to the second transfer transistor;
  a dual floating diffusion transistor coupled between the first and second floating diffusions;
  an overflow transistor coupled to the second photodiode;
  a capacitor coupled between a voltage source and the overflow transistor;
  a capacitor readout transistor coupled between the overflow transistor and the second floating diffusion; and
  an anti-blooming transistor coupled between the first photodiode and a power line;
 a control circuitry coupled to the pixel array to control operation of the pixel array, wherein the control circuitry is configured to (a) selectively turn on the anti-blooming transistor to disable the first photodiode during a readout of the second photodiode and (b) selectively turn off the anti-blooming transistor for a readout of the first photodiode such that charge stored in the first photodiode can be read out during the readout of the first photodiode; and
 a readout circuitry coupled to the pixel array to read out image data from the plurality of pixel circuits.

17. The imaging system of claim 16, further comprising function logic coupled to the readout circuitry to store the image data from each one of the plurality of pixel circuits.

18. The imaging system of claim 16, wherein each one of the plurality of pixel circuits further comprises:
 a source follower transistor having a gate coupled to the first floating diffusion; and
 a row select transistor coupled to the source follower transistor, wherein the source follower transistor and the row select transistor are coupled between the power line and a bitline.

19. The imaging system of claim 18, wherein each one of the plurality of pixel circuits further comprises a reset transistor coupled between the power line and the first floating diffusion.

20. The imaging system of claim 18, wherein each one of the plurality of pixel circuits further comprises a reset transistor coupled between the voltage source and the second floating diffusion.

21. The imaging system of claim 20, further comprising at least a first wafer and a second wafer stacked with the first wafer.

22. The imaging system of claim 21, further comprising:
 a first wafer; and
 a second wafer stacked with the first wafer, wherein the overflow transistor of said each one of the plurality of pixel circuits is included in the first wafer, wherein the capacitor of said each one of the plurality of pixel circuits is included in the second wafer, wherein the overflow transistor of said each one of the plurality of pixel circuits is coupled to the capacitor of said each one of the plurality of pixel circuits through a respective first hybrid bond between the first wafer and the second wafer.

23. The imaging system of claim 22, wherein the first and second photodiodes, the first and second transfer transistors, the first floating diffusion, and the anti-blooming transistor of said each one of the plurality of pixel circuits are included in the first wafer.

24. The imaging system of claim 23,
 wherein the capacitor readout transistor of said each one of the plurality of pixel circuits is included in the first wafer, wherein the capacitor readout transistor of said each one of the plurality of pixel circuits is coupled to the capacitor of said each one of the plurality of pixel circuits through the respective first hybrid bond between the first wafer and the second wafer,
 wherein the reset transistor, the second floating diffusion, the dual floating diffusion transistor, the source follower transistor, and the row select transistor of said each one of the plurality of pixel circuits is further included in the first wafer.

25. The imaging system of claim 23,
 wherein the capacitor readout transistor, the reset transistor, the second floating diffusion, the dual floating diffusion transistor, the source follower transistor, and the row select transistor of said each one of the plurality of pixel circuits are included in the second wafer,
 wherein the first floating diffusion of said each one of the plurality of pixel circuits is coupled to the gate of the source follower transistor and the dual floating diffusion transistor of said each one of the plurality of pixel circuits through a respective second hybrid bond between the first wafer and the second wafer,
 wherein the second transfer transistor of said each one of the plurality of pixel circuits is coupled to the second floating diffusion of said each one of the plurality of pixel circuits through a respective third hybrid bond between the first wafer and the second wafer.

26. The imaging system of claim 16, wherein the first photodiode of said each one of the plurality of pixel circuits has a first light sensitivity and the second photodiode of said each one of the plurality of pixel circuits has a second light sensitivity, wherein the first light sensitivity is greater than the second light sensitivity.

27. The imaging system of claim 16, wherein a first conversion gain signal is configured to be read out from said each one of the plurality of pixel circuits in response to the charge photogenerated by the first photodiode that is transferred to the first floating diffusion of said each one of the plurality of pixel circuits, wherein the dual floating diffusion transistor of said each one of the plurality of pixel circuits is configured to be turned off when the first conversion gain signal is read out from said each one of the plurality of pixel circuits.

28. The imaging system of claim 26, wherein a second conversion gain signal is configured to be read out from said each one of the plurality of pixel circuits in response to the charge photogenerated by the first photodiode that is transferred to the first floating diffusion and to the second floating diffusion of said each one of the plurality of pixel circuits, wherein the dual floating diffusion transistor of said each one of the plurality of pixel circuits is configured to be turned on and the capacitor readout transistor of said each one of the plurality of pixel circuits is configured to be turned off when the second conversion gain signal is read out from said each one of the plurality of pixel circuits.

29. The imaging system of claim 26, wherein a third conversion gain signal is configured to be read out from the pixel circuit in response to the charge photogenerated by the second photodiode that is transferred to the second floating diffusion and to the first floating diffusion, wherein the dual floating diffusion transistor and the anti-blooming transistor are configured to be turned on and the capacitor readout transistor is configured to be turned off when the third conversion gain signal is read out from the pixel circuit.

30. The imaging system of claim 16, wherein excess charge photogenerated by the second photodiode of said each one of the plurality of pixel circuits in response to a bright incident light is configured to overflow from the second photodiode of said each one of the plurality of pixel circuits to the capacitor of said each one of the plurality of pixel circuits through the overflow transistor of said each one of the plurality of pixel circuits.

31. The imaging system of claim 30, wherein a fourth conversion gain signal is configured to be read out from said each one of the plurality of pixel circuits in response to the charge photogenerated by the second photodiode of said each one of the plurality of pixel circuits that is transferred to the second floating diffusion and to the first floating diffusion of said each one of the plurality of pixel circuits and in response to the excess charge photogenerated by the second photodiode of said each one of the plurality of pixel circuits that has overflowed to the capacitor of said each one of the plurality of pixel circuits in response to the bright incident light, wherein the dual floating diffusion transistor, the capacitor readout transistor, and the anti-blooming transistor of said each one of the plurality of pixel circuits are configured to be turned on disabling the first photodiode when the fourth conversion gain signal is read out from said each one of the plurality of pixel circuits.

32. The imaging system of claim 31, wherein a third conversion gain signal is configured to be read out from the pixel circuit in response to the charge photogenerated by the second photodiode that is transferred to the second floating diffusion and to the first floating diffusion, wherein the dual floating diffusion transistor and the anti-blooming transistor are configured to be turned on and the capacitor readout transistor is configured to be turned off when the third conversion gain signal is read out from the pixel circuit, and wherein the image data of each one of the plurality of pixel circuits is generated based on the third and fourth conversion gain signals.

* * * * *